Jan. 8, 1946.   K. A. WRIGHT   2,392,352
METHOD OF PLACING CEMENT PLUGS IN WELL BORES
Filed Aug. 6, 1941
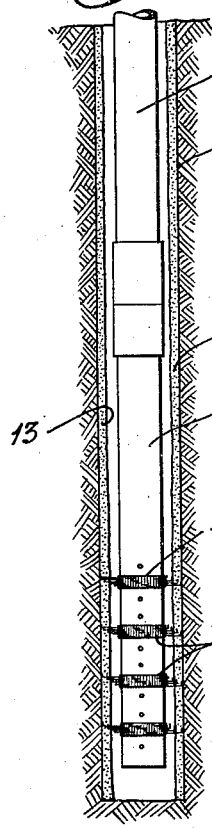
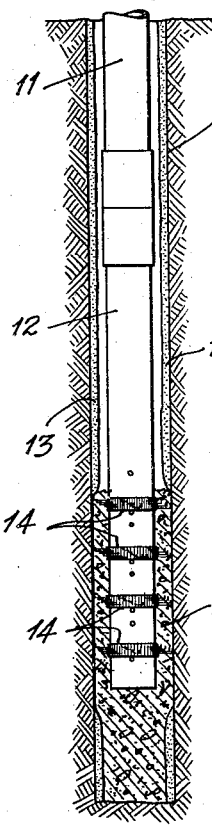
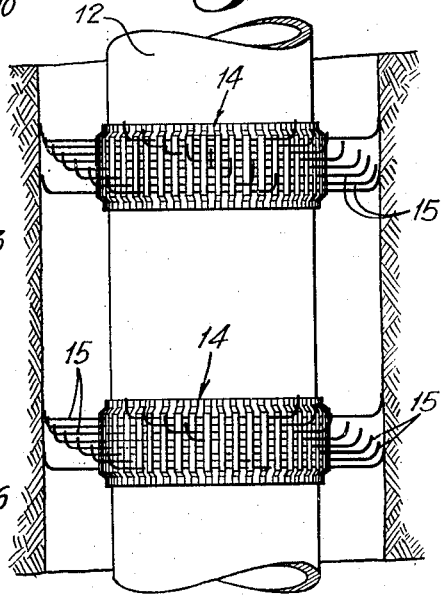
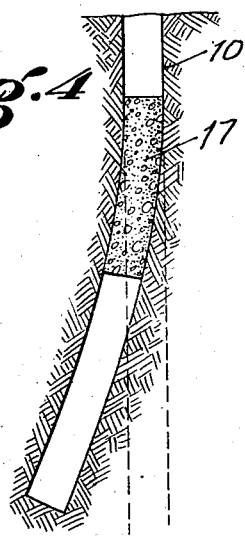
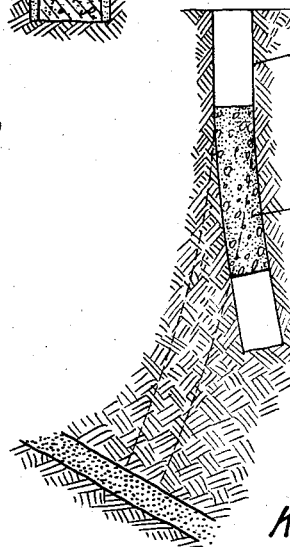
Inventor:
KENNETH A. WRIGHT,
By
Attorney.

Patented Jan. 8, 1946

2,392,352

UNITED STATES PATENT OFFICE 2,392,352

METHOD OF PLACING CEMENT PLUGS IN WELL BORES

Kenneth A. Wright, Los Angeles, Calif.

Application August 6, 1941, Serial No. 405,658

4 Claims. (Cl. 166—22)

This invention relates to oil well practice and particularly pertains to a method of placing a cement plug in a well bore, and is a continuation in part of my co-pending application entitled "Method and means of conditioning the walls of well bores," filed in the United States Patent Office by me August 19, 1939, and bearing Serial No. 291,027, now Patent No. 2,338,372, granted January 4, 1944.

In completing oil and gas wells, it is common practice to set cement plugs or bridges in the wells at a desired depth for the purpose of filling the previously drilled well bore with an impervious bridge or plug of cement which seals the space between overlying and underlying formations, and thus prevents the migration of fluids from one formation to the other. In providing a cement plug or bridge within a well bore it is necessary that the cement plug be formed at the correct depth in the well. The plug should also be impervious and tightly bonded to the walls of the virgin geological formation. Heretofore there has been no practice or method which would assure the direct bonding of the cement with the virgin earth formation and as a consequence there has often been a complete failure of the cement plug to seal the space between contiguous geological formations. Failure of the cement plugs or bridges is usually caused by the lack of cohesion or lack of contact between the cement plug and the walls of the formation. This is primarily due to the fact that in drilling a well mud-laden fluid is circulated downwardly through the drill string and bit, and then flows upwardly within the well bore to bring the well cuttings to the surfaces to support the side walls of the well bore and to plaster the side walls of the well bore. This circulation of the mud-laden fluid causes a sheath of mud to be formed within the well bore as a lining, and when, in accordance with the prior practice a cement plug is placed within the well bore without removing this sheath the cement will not contact with the earth formation at the walls of the bore and cannot form a satisfactory bond therewith. Without an effective bond between the cement and the earth formation a leak is likely to develop between the cement plug and the walls of the virgin formation. It often happens that the fluid in the well below the plug will channel around the plug leaving a portion of the space uncemented and resulting in a failure of the plug. It is the principal object of the present invention to provide a method of forming and placing a cement plug or bridge in a well bore at a selected depth and of proper thickness to create an effective fluid seal between contiguous geological formations, thus preventing the migration of fluids between the formations so separated.

Another object of the invention is to provide a method for placing a cement plug in a well that assures the direct contact of the cement with the virgin earth formation providing a positive seal and definitely preventing the channeling of fluid around or past the plug.

The present invention contemplates a method of the character mentioned in which a wash pipe, upon which are mounted means for abrading the surface of the walls of the well bore prior to, during, and after the time of placement of the cement plug in the well bore, is reciprocated within the well bore as well as rotated so that the abrading means removes the mud sheath occurring on the walls of the well bore, the method thereafter providing for the introduction of cement slurry downwardly through the wash pipe to the area of the well bore being abraded, the abrading means then acting to mix and puddle the cement slurry during its placement, whereby the cement will be uniformly mixed and will not channel as it is being set.

The invention is illustrated by way of example in the accompanying drawing, in which:

Figure 1 is a view in longitudinal section showing a well bore and indicates the preliminary condition of the well bore before a cement plug or bridge is set.

Fig. 2 is a view similar to Fig. 1 showing the well bore with the apparatus for practising the present method positioned in the well.

Fig. 3 is an enlarged fragmentary view showing the abrading means as mounted upon a wash pipe or the like.

Fig. 4 is a view in diagram indicating the use of a cement plug for a whipstock drilling operation to straighten the hole.

Fig. 5 is a view in diagram indicating the use of a cement plug for a whipstock drilling operation to change the direction of a hole.

Referring more particularly to the drawing, 10 indicates a well bore. In accordance with the invention a string of drill pipe 11 which carries one or more joints of plain pipe or tubing 12, commonly known as wash pipe is lowered into the well. Circulation of drilling fluid is effected through the drill string 11 and the wash pipe 12 so that the mud fluid will pass outwardly into the well bore at the lower end of the wash pipe and will then circulate upwardly around the wash pipe to the top of the well. As previously explained, this fluid tends to create a sheathing or lining of mud within the well as indicated at 13. It is a feature of the invention that this sheathing 13 is removed to uncover the virgin formation throughout the area of intended placement of the plug, and for that reason abrading units 14 are mounted upon the wash pipe adjacent to the lower end thereof. These units are indicated in detail in Fig. 3 of the drawing and are preferably of the type disclosed in my co-pending application entitled "Well production equipment" Serial No. 369,389, filed December 10, 1940, now Patent No. 2,374,317, granted April 24, 1945. The upper end of the drill string 11 is supported in a suitable manner at the well rig, whereby the drill string may be raised and lowered, and rotated, to cause the abrading fingers 15 of the units 14 to scratch the mud sheathing 13 and to break it up. The string 11 is reciprocated and/or rotated so that the fingers 15 scratch off the mud sheath and during this operation mud fluid is being circulated within the well. The circulating fluid acts to carry the pieces of mud sheathing upwardly and to wash the exposed walls of the formation. Cement slurry is then pumped down through the drill string to a desired location. The cement slurry is pumped downwardly through the drill string and out into the well to form the desired plug in the well bore, during which time the drill string and wash pipe are continuously reciprocated or rotated so that the abrading members 15 of the units 14 will thoroughly agitate the cement to prevent it from becoming entrained with gas or other fluids, and to insure that it will be thoroughly worked to fill the desired space and to form an intimate bond with the wall of the well bore. When the required quantity of cement slurry has been discharged into the well, the string 11 is raised to bring the lower end of the wash pipe 12 to a selected point at or above the body of cement which forms the plug. Mud fluid may then be circulated through the string 11 and wash pipe 12 to flush away the excess cement. It is to be understood that while the method may be practised in forming a plug 16 at the bottom of the well bore, it may also be used to form a bridge at any height in the well bore.

As a specific example of the practice of the present method, it will be assumed that an oil well has been drilled to a depth of 5000 feet and that the diameter of the lowest 1000 feet of the well bore is 10 inches. After the well has been drilled to this depth and a log has been run to determine the possible productive zones at which the well should be bridged or plugged, it will be assumed that oil or gas sand was located at a depth of 4500 feet and continued to a depth of 4800 feet. In such an instance it might occur that a body of impervious geological formation is encountered between a depth of 4800 feet and 4900 feet, and that below the 4900 foot depth to the depth of 5000 feet a bed of grey sand containing salt water is encountered. It is, therefore, the problem to complete the well in the oil sand and exclude the migration of salt water from the zone between the bottom of the well and the 4900 foot level. This is done by forming a cement plug or bridge in the well from the top of the water sand level upwardly to the bottom of the oil sand. Under such circumstances approximately 150 feet of 3-inch wash pipe, as indicated at 12, is placed on the lower end of a string of drill pipe 11 and secured thereto and in communication therewith. Additional drill pipe is added to the drill string until the bottom of the wash pipe 12 is at a level of 4900 feet. Before placing the wash pipe in the well the abrasive units 14 are mounted upon the wash pipe at intervals of 10 feet and arranged uniformly over the lower 1000 feet of wash pipe. The radial length of the abrading elements 15 is such as to insure that the units 14 will be of a diameter slightly greater than the 10-inch diameter of the well bore. Circulation of mud-laden fluid is then established by pumping the fluid downwardly through the drill string and the wash pipe until the well bore is filled with drilling fluid and it overflows into a ditch at the top of the well. Sufficient cement slurry is then pumped down the drill pipe and wash pipe to displace well fluid within the wash pipe and the well bore. This is continued until the cement slurry inside and outside of the wash pipe stands at a level of approximately 4750 feet. Just before the cement slurry reaches the bottom of the wash pipe the drill pipe and wash pipe are reciprocated and rotated over an area of approximately 15 feet in the length of the well bore. This causes abrasion of the walls of the well bore at a point between the 4800- and 4900-foot level. Rotation and reciprocation of the drill pipe is continued until the mass of cement forming the cement bridge or plug reaches an equal height within the wash pipe and within the well bore surrounding the wash pipe. The wash pipe is then raised until its lower end is at approximately the 4800-foot level. Circulation is then continued with mud-laden fluid until the excess of cement slurry above the 4800-foot level overflows at the top of the well and is carried away. In this manner the top of the cement plug is established at 4800 feet and an impervious cement plug will occur below that level firmly bonded to the walls of the well bore and acting to exclude fluids below the 4900-foot level from entering the oil sand above the 4800-foot level.

In the foregoing description the present method has been set forth as producing cement plugs and bridges required in solving well production problems. It is also to be understood that the invention may be practised to great advantage in setting cement plugs for changing well courses by directional drilling, such for example as when a whipstock or knuckle joint is used. Under normal operations these devices tend to follow the relatively soft mud sheath in the well. However, if the well bore is prepared and the cement plug 17 set as herein disclosed, it is obvious that the direction of drilling may be positively controlled and the drill caused to penetrate the virgin geological formation.

It will thus be seen that by the method here disclosed it is possible to thoroughly clean the walls of a well bore by removing the mud cake forming a sheathing therein and thus insuring a secure bond between a cement plug or bridge and the walls of the geological formation; furthermore, that the invention insures a thoroughly mixed and solid cement plug through which fluids cannot channel and by which a complete shut-off of the well bore is produced.

While I have shown the preferred steps of my method, it is to be understood that variations may be made in practising the invention as would occur to those skilled in the art without departing from the spirit of the invention as claimed.

Having thus described my invention, what I claim and desire to secure by Letters Patent is:

1. A method of placing a cement plug or the like in a well bore, including mechanically abrading the wall of the well bore at the zone in which the plug is to be formed by operating an abrading means in said zone of the well, whereby extraneous material on the walls of the well bore is dislodged, therefrom circulating liquid into and out of the well bore to remove said dislodged extraneous material, then delivering a quantity of cement slurry to the zone at which the plug is to be formed in the well and while mechanically agitating the mass of cement thus delivered by movement of the abrading means, and thereafter withdrawing the abrading means from the mass of cementitious material, and then allowing the cement to set.

2. In a method of placing a cement plug or the like in an oil well, in which a wash pipe carrying abrading means is lowered into a well, which method comprises lowering the wash pipe into the well to dispose the abrading means in a zone of the well bore in which a cement plug is to be placed, thereafter manipulating the wash pipe from the top of the well to dislodge extraneous material from the surface of the geological formation penetrated by the well bore by the action of the abrading means, then circulating mud fluid downwardly through the wash pipe and upwardly within the well bore to carry away the dislodged extraneous material, then pumping cement slurry downwardly through the wash pipe and upwardly in the well bore in the area occupied by the abrading means, agitating the mass of cement slurry in the well bore by operating the abrading means, and thereafter withdrawing the wash pipe and the abrading means from the well bore to allow the mass of cement standing within said zone of the well bore to set and form a plug.

3. In a method of placing a cement plug or the like in an oil well, in which a wash pipe carrying abrading means is lowered into a well, which method comprises lowering the wash pipe into the well to dispose the abrading means in the zone of the well bore in which a cement plug is to be placed, thereafter manipulating the wash pipe from the top of the well to dislodge extraneous material from the wall of said zone of the well bore by the abrading means, then circulating fluid downwardly through the wash pipe and upwardly within the well bore to carry off the dislodged extraneous material, then pumping cement slurry downwardly through the wash pipe and upwardly in the well bore in the area occupied by the abrading means, agitating the mass of cement slurry in said zone of the well bore by operation of the abrading means therein, and thereafter elevating the wash pipe until its lower end is at the level intended to be the level of the upper end of the cement plug, then pumping fluid downwardly through the wash pipe and upwardly therearound to carry off the surplus cement slurry standing above the level determined for the top of the plug, withdrawing the pipe from the well, and permitting the remaining cement to set in the well.

4. The method of placing a cement plug in a well bore including lowering a wash pipe carrying scratching means into the well bore to bring the scratching means to the zone of the well bore in which the plug is to be placed, removing foreign matter from the wall of said zone of the well bore by moving the wash pipe so that the scratching means frees the foreign matter from the well wall to expose the virgin earth formation, circulating fluid through the wash pipe and well bore to carry away the freed foreign matter and to wash the wall of the bore in said zone, delivering fluid cementitious material to said zone to constitute the plug by passing the cementitious material down through the wash pipe to said zone, puddling the cementitious material and causing it to directly bond with the earth formation at the wall of the well bore in said zone by moving the wash pipe so that the scratching means agitates the cementitious material and scratches said earth formation in the presence of the cementitious material, withdrawing the wash pipe from the well bore, and allowing the cementitious material to set and harden.

KENNETH A. WRIGHT.